US012598520B2

(12) United States Patent
Bulakci et al.

(10) Patent No.: US 12,598,520 B2
(45) Date of Patent: Apr. 7, 2026

(54) MANAGING FREQUENCY PREFERENCES

(71) Applicant: Nokia Technologies Oy, Espoo (FI)

(72) Inventors: Omer Bulakci, Munich (DE); Osman Nuri Can Yilmaz, Espoo (FI); Gyorgy Tamas Wolfner, Budapest (HU); Ahmad Awada, Munich (DE); Malgorzata Tomala, Wroclaw (PL); Muhammad Naseer-Ul-Islam, Munich (DE)

(73) Assignee: Nokia Technologies Oy, Espoo (FI)

( * ) Notice: Subject to any disclaimer, the term of this patent is extended or adjusted under 35 U.S.C. 154(b) by 326 days.

(21) Appl. No.: 18/272,387

(22) PCT Filed: Jan. 12, 2022

(86) PCT No.: PCT/EP2022/050503
§ 371 (c)(1),
(2) Date: Jul. 14, 2023

(87) PCT Pub. No.: WO2022/152729
PCT Pub. Date: Jul. 21, 2022

(65) Prior Publication Data
US 2024/0073754 A1 Feb. 29, 2024

(30) Foreign Application Priority Data
Jan. 14, 2021 (GB) ..................................... 2100482

(51) Int. Cl.
*H04W 36/00* (2009.01)
*H04W 36/32* (2009.01)
(Continued)

(52) U.S. Cl.
CPC ..... *H04W 36/0072* (2013.01); *H04W 36/322* (2023.05); *H04W 36/38* (2013.01);
(Continued)

(58) Field of Classification Search
CPC ... H04W 48/18; H04W 48/08; H04W 12/033; H04W 12/06; H04W 48/16; H04W 76/10
See application file for complete search history.

(56) References Cited

U.S. PATENT DOCUMENTS

| | | | | |
|---|---|---|---|---|
| 8,391,906 B2 * | 3/2013 | Flore | ............... | H04W 36/00835 455/67.11 |
| 9,002,351 B2 * | 4/2015 | Bozionek | ................ | H04W 4/16 455/432.1 |

(Continued)

FOREIGN PATENT DOCUMENTS

| | | | | | |
|---|---|---|---|---|---|
| EP | 2995119 | B1 | * | 4/2017 | ........ H04W 36/0064 |
| EP | 4221357 | A1 | * | 8/2023 | ............ H04W 40/24 |

(Continued)

OTHER PUBLICATIONS

3GPP TS 38.331 V15.5.1 (Apr. 2019) (Year: 2019) 3rd Generation Partnership Project; Technical Specificastion Group Radio Access Network; NR; Radio Resource Control (RRC) Protocol Specification (Release 15) (Year: 2019).*

(Continued)

*Primary Examiner* — Julio R Perez
(74) *Attorney, Agent, or Firm* — McCarter & English LLP

(57) ABSTRACT
Examples of the disclosure relate to an apparatus configured to enable priority configurations to be updated. The apparatus can be configured to perform receiving information indicative of at least one validity area for the apparatus wherein the at least one validity area comprises includes an area in which priority configurations assigned to the apparatus are valid; detecting that the apparatus has moved out of the at least one validity area; in response to detecting that the apparatus has moved out of the at least one validity area performing at least one of: receiving at least one new priority configuration and following the at least one new priority (Continued)

configuration, or triggering a state change to a connected mode to obtain at least one new priority configuration from an access node.

14 Claims, 9 Drawing Sheets

(51) Int. Cl.
  *H04W 36/38*       (2009.01)
  *H04W 48/16*       (2009.01)
  *H04W 48/18*       (2009.01)
  *H04W 72/563*      (2023.01)
(52) U.S. Cl.
  CPC ........... *H04W 48/16* (2013.01); *H04W 48/18* (2013.01); *H04W 72/563* (2023.01)

(56) References Cited

U.S. PATENT DOCUMENTS

| | | | | |
|---|---|---|---|---|
| 11,627,137 | B2 * | 4/2023 | Chauhan | H04L 63/108 |
| | | | | 726/4 |
| 12,369,113 | B2 * | 7/2025 | Liu | H04W 12/69 |
| 2016/0036786 | A1 * | 2/2016 | Gandhi | H04W 12/06 |
| | | | | 713/168 |
| 2020/0260348 | A1 * | 8/2020 | da Silva | H04W 36/0079 |
| 2020/0382605 | A1 * | 12/2020 | Ouyang | H04W 40/20 |
| 2021/0068044 | A1 * | 3/2021 | Chan | H04W 48/18 |
| 2022/0150741 | A1 * | 5/2022 | Teyeb | H04L 5/001 |
| 2023/0362802 | A1 * | 11/2023 | Suh | H04W 48/08 |
| 2024/0031928 | A1 * | 1/2024 | Wang | H04W 48/08 |
| 2024/0073754 | A1 * | 2/2024 | Bulakci | H04W 36/0072 |
| 2025/0063446 | A1 * | 2/2025 | Ishii | H04W 36/08 |
| 2025/0113395 | A1 * | 4/2025 | Starsinic | H04W 28/0925 |

FOREIGN PATENT DOCUMENTS

| | | | | | |
|---|---|---|---|---|---|
| EP | | 4496385 | A1 * | 1/2025 | ........... H04W 60/06 |
| JP | | 2019525651 | A | 9/2019 | |
| WO | | WO-2019119377 | A | 6/2019 | |
| WO | | WO-2021123892 | A1 * | 6/2021 | ........... H04W 48/00 |
| WO | | WO-2021132190 | A1 * | 7/2021 | ........... H04W 88/06 |
| WO | | WO-2025083321 | A1 * | 4/2025 | ........... H04W 24/02 |

OTHER PUBLICATIONS

China UNICOM, "Discussion on slice based cell reselection under network control," 3GPP TSG-RAN WG2 Meeting #112, R2-2009536, Nov. 2-13, 2020.

CMCC, "Email discussion on open issues for RAN slicing SI," 3GPP TSG-RAN WG2 Meeting #112, R2-2010366, Nov. 2-13, 2020.

Huawei et al., "Correction to TC 8.1.1.3.4-NR2L reselection by RRCRelease," 3GPP TSG-RAN5 Meeting #84, R5-197052, Aug. 26-30, 2019, Ljubljana, Slovenia.

CMCC, "Report of [Post112-e][253][RAN slicing] Prioritized solutions for RAN," 3GPP TSG-RAN WG2 Meeting #113, R2-2101802, Jan. 25-Feb. 5, 2021.

"Discussion on SA2 LS and solutions for slice-based cell reselection", CMCC, 3GPP TSG-RAN WG2 Meeting #112 electronic, R2-2010367, Nov. 2020, 6 pages.

* cited by examiner

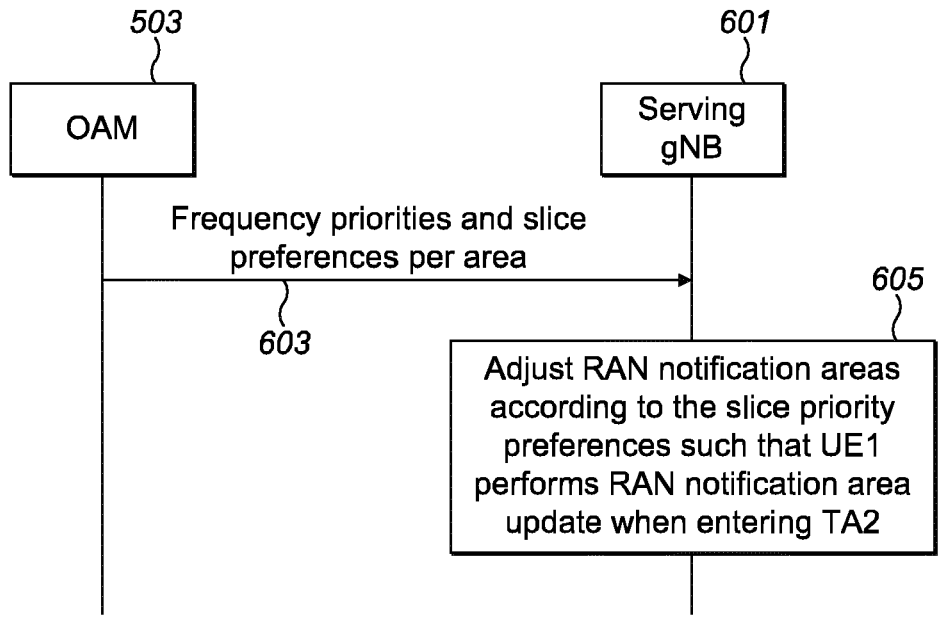

*503*

OAM

Frequency priorities and slice
preferences per area

*603*

*601*

Serving
gNB

*605*

Adjust RAN notification areas
according to the slice priority
preferences such that UE1
performs RAN notification area
update when entering TA2

Neighbor
gNB(s)

Frequency priorities and slice
preferences per area

*609*

*601*

Serving
gNB

*611*

Adjust RAN notification areas
according to the slice priority
preferences such that UE1
performs RAN notification area
update when entering TA2

MANAGING FREQUENCY PREFERENCES

CROSS REFERENCE TO RELATED APPLICATION

This patent application is a U.S. National Stage application of International Patent Application Number PCT/EP2022/050503 filed Jan. 12, 2022, which is hereby incorporated by reference in its entirety, and claims priority to GB 2100482.5 filed Jan. 14, 2021.

TECHNOLOGICAL FIELD

Examples of the disclosure relate to managing frequency preferences. Some relate to managing frequency preferences in new radio (NR) networks.

BACKGROUND

Radio communications networks such as NR networks can have different priority configurations in different areas and/or for different network slices. Examples of this disclosure provide for management of these priority configurations.

BRIEF SUMMARY

According to various, but not necessarily all, examples of the disclosure, there is provided an apparatus comprising means for: receiving information indicative of at least one validity area for the apparatus wherein the at least one validity area comprises an area in which at least one priority configuration assigned to the apparatus is valid; detecting that the apparatus has moved out of the at least one validity area; in response to detecting that the apparatus has moved out of the at least one validity area performing at least one of: receiving at least one new priority configuration and following the at least one new priority configuration, or triggering a state change to a connected mode to obtain at least one new priority configuration from an access node.

The at least one priority configuration and the at least one new priority configuration may comprise at least one frequency priority configuration.

The at least one priority configuration and the at least one new priority configuration may comprise at least one frequency priority configurations for at least one network slice.

The at least one frequency priority configuration may comprise information indicative of any one or more of:
at least one network slice preference;
at least one network slice ID.

The validity area may be assigned to one or more apparatus.

The information indicative of the validity area may be received in dedicated signalling.

The validity area may comprise at least one of; one or more cells, one or more tracking areas, one or more Radio Access Network (RAN)—based Notification Areas, one or more RAN areas.

The means may be for causing the apparatus to terminate the at least one priority configuration assigned to the apparatus in response to detecting that the apparatus has moved out of the validity area.

The means may be for triggering early expiration of timer T320 to trigger termination of the at least one priority configuration assigned to the apparatus in response to detecting that the apparatus has moved out of the validity area.

The means may be for causing the apparatus to prevent timer T320 being started when the apparatus is assigned the at least one priority configuration.

The information indicative of the validity area may be associated with at least one network slice ID.

According to various, but not necessarily all, examples of the disclosure, there is provided a User Equipment (UE) comprising an apparatus as described herein and at least one Subscriber Identity Module (SIM).

According to various, but not necessarily all, examples of the disclosure, there is provided a Mobile Terminal (MT) comprising an apparatus as described herein According to various, but not necessarily all, examples of the disclosure, there is provided an apparatus comprising: at least one processor; and at least one memory including computer program code; the at least one memory and the computer program code configured to, with the at least one processor, cause the apparatus at least to perform; receiving information indicative of at least one validity area for the apparatus wherein the at least one validity area comprises an area in which at least one priority configuration assigned to the apparatus is valid; detecting that the apparatus has moved out of the at least one validity area; in response to detecting that the apparatus has moved out of the at least one validity area performing at least one of: receiving at least one new priority configuration and following the at least one new priority configuration, or triggering a state change to a connected mode to obtain at least one new priority configuration from an access node.

According to various, but not necessarily all, examples of the disclosure, there is provided a method comprising: receiving information indicative of at least one validity area for the apparatus wherein the at least one validity area comprises an area in which at least one priority configuration assigned to the apparatus is valid; detecting that the apparatus has moved out of the at least one validity area; in response to detecting that the apparatus has moved out of the at least one validity area performing at least one of: receiving at least one new priority configuration and following the at least one new priority configuration, or triggering a state change to a connected mode to obtain at least one new priority configuration from an access node.

According to various, but not necessarily all, examples of the disclosure there is provided a computer program comprising computer program instructions that, when executed by processing circuitry, cause: receiving information indicative of at least one validity area for the apparatus wherein the at least one validity area comprises an area in which at least one priority configuration assigned to the apparatus is valid; detecting that the apparatus has moved out of the at least one validity area; in response to detecting that the apparatus has moved out of the at least one validity area performing at least one of: receiving at least one new priority configuration and following the at least one new priority configuration, or triggering a state change to a connected mode to obtain at least one new priority configuration from an access node.

According to various, but not necessarily all, examples of the disclosure there is provided a network apparatus comprising means for: collecting information indicative of a validity area for an apparatus wherein the validity area comprises an area in which at least one priority configuration assigned to the apparatus is valid; and transmitting the information indicative of the validity area to the apparatus.

The information indicative of the validity area may be transmitted to the apparatus via dedicated signalling.

The network apparatus may comprise means for collecting information indicative of frequency preferences and network slice priorities at different access nodes in the network and using the collected information to determine the validity area.

The network apparatus may comprise means for causing transmission of at least one new priority configuration to the apparatus when it is determined that the apparatus has moved out of the validity area.

According to various, but not necessarily all, examples of the disclosure there is provided a network apparatus comprising: at least one processor; and at least one memory including computer program code; the at least one memory and the computer program code configured to, with the at least one processor, cause the network apparatus at least to perform; collecting information indicative of a validity area for an apparatus wherein the validity area comprises an area in which at least one priority configuration assigned to the apparatus is valid; and transmitting the information indicative of the validity area to the apparatus.

According to various, but not necessarily all, examples of the disclosure there is provided a method comprising: receiving information indicative of at least one validity area for the apparatus wherein the at least one validity area comprises an area in which at least one priority configuration assigned to the apparatus is valid; collecting information indicative of a validity area for an apparatus wherein the validity area comprises an area in which at least one priority configuration assigned to the apparatus is valid; and transmitting the information indicative of the validity area to the apparatus.

According to various, but not necessarily all, examples of the disclosure there is provided a computer program comprising computer program instructions that, when executed by processing circuitry, cause: collecting information indicative of a validity area for an apparatus wherein the validity area comprises an area in which at least one priority configuration assigned to the apparatus is valid; and transmitting the information indicative of the validity area to the apparatus.

According to various, but not necessarily all, examples of the disclosure there is provided a network apparatus comprising means for: obtaining priority configuration information for a plurality of different areas; identifying a plurality of areas having the same priority configuration; determining that an apparatus has moved from a first area having a first priority configuration to a second area having a second, different priority configuration; enabling updating of the priority configuration for the apparatus.

The priority configuration information for a plurality of different areas may be obtained from at least one of, one or more gNBs, one or more Management Entities.

The areas having the same priority configuration may provide a tracking area.

The tracking area may comprise at least one of a Registration area, a RAN Notification Area.

The network apparatus may determine that the apparatus has moved from a first area to a second area in response to a notification from the apparatus.

The network apparatus may be an Access and Mobility Management Function (AMF).

The apparatus that has moved from a first area to a second area may be provided within an idle User Equipment (UE).

The network apparatus may be a serving gNB.

According to various, but not necessarily all, examples of the disclosure there is provided a network apparatus comprising: at least one processor; and at least one memory including computer program code; the at least one memory and the computer program code configured to, with the at least one processor, cause the network apparatus at least to perform; obtaining priority configuration information for a plurality of different areas; identifying a plurality of areas having the same priority configuration; determining that an apparatus has moved from a first area having a first priority configuration to a second area having a second, different priority configuration; enabling updating of the priority configuration for the apparatus.

According to various, but not necessarily all, examples of the disclosure there is provided a method comprising: obtaining priority configuration information for a plurality of different areas; identifying a plurality of areas having the same priority configuration; determining that an apparatus has moved from a first area having a first priority configuration to a second area having a second, different priority configuration; enabling updating of the priority configuration for the apparatus.

According to various, but not necessarily all, examples of the disclosure there is provided a computer program comprising computer program instructions that, when executed by processing circuitry, cause: obtaining priority configuration information for a plurality of different areas; identifying a plurality of areas having the same priority configuration; determining that an apparatus has moved from a first area having a first priority configuration to a second area having a second, different priority configuration; enabling updating of the priority configuration for the apparatus.

According to various, but not necessarily all, examples of the disclosure there may be provided an apparatus comprising means for: receiving at least one priority configuration assigned to the apparatus; detecting a difference between the at least one priority configuration assigned to the apparatus and the network priority configurations for an area in which the apparatus is located; in response to detecting the differences, causing the apparatus to change to a connected mode to enable at least one new priority configuration to be assigned to the apparatus.

The apparatus may detect the difference between the at least one priority configuration assigned to the apparatus and the network priority configurations for an area in which the apparatus is located when the apparatus moves outside of the area where the apparatus received the at least one priority configuration.

The apparatus may detect the difference between the at least one priority configuration assigned to the apparatus and the network priority configurations for an area in which the apparatus is located when the apparatus moves outside of the tracking area where the apparatus received the at least one priority configuration.

The apparatus may detect the difference between the at least one priority configuration assigned to the apparatus and the network priority configurations for an area in which the apparatus is located when the apparatus moves outside of the cell where the apparatus received the at least one priority configuration.

According to various, but not necessarily all, examples of the disclosure there is provided an apparatus comprising: at least one processor; and at least one memory including computer program code; the at least one memory and the computer program code configured to, with the at least one processor, cause the apparatus at least to perform; receiving at least one priority configuration assigned to the apparatus; detecting a difference between the at least one priority configuration assigned to the apparatus and the network priority configurations for an area in which the apparatus is located; in response to detecting the differences, causing the apparatus to change to a connected mode to enable at least one new priority configuration to be assigned to the apparatus.

According to various, but not necessarily all, examples of the disclosure there is provided a method comprising: receiving at least one priority configuration assigned to the apparatus; detecting a difference between the at least one priority configuration assigned to the apparatus and the network priority configurations for an area in which the apparatus is located; in response to detecting the differences, causing the apparatus to change to a connected mode to enable at least one new priority configuration to be assigned to the apparatus.

According to various, but not necessarily all, examples of the disclosure there is provided a computer program comprising computer program instructions that, when executed by processing circuitry, cause: receiving at least one priority configuration assigned to the apparatus; detecting a difference between the at least one priority configuration assigned to the apparatus and the network priority configurations for an area in which the apparatus is located; in response to detecting the differences, causing the apparatus to change to a connected mode to enable at least one new priority configuration to be assigned to the apparatus.

BRIEF DESCRIPTION

Some examples will now be described with reference to the accompanying drawings in which:

FIGS. 6A and 6B show another example of the subject matter described herein;

DEFINITIONS

Figure 1A:
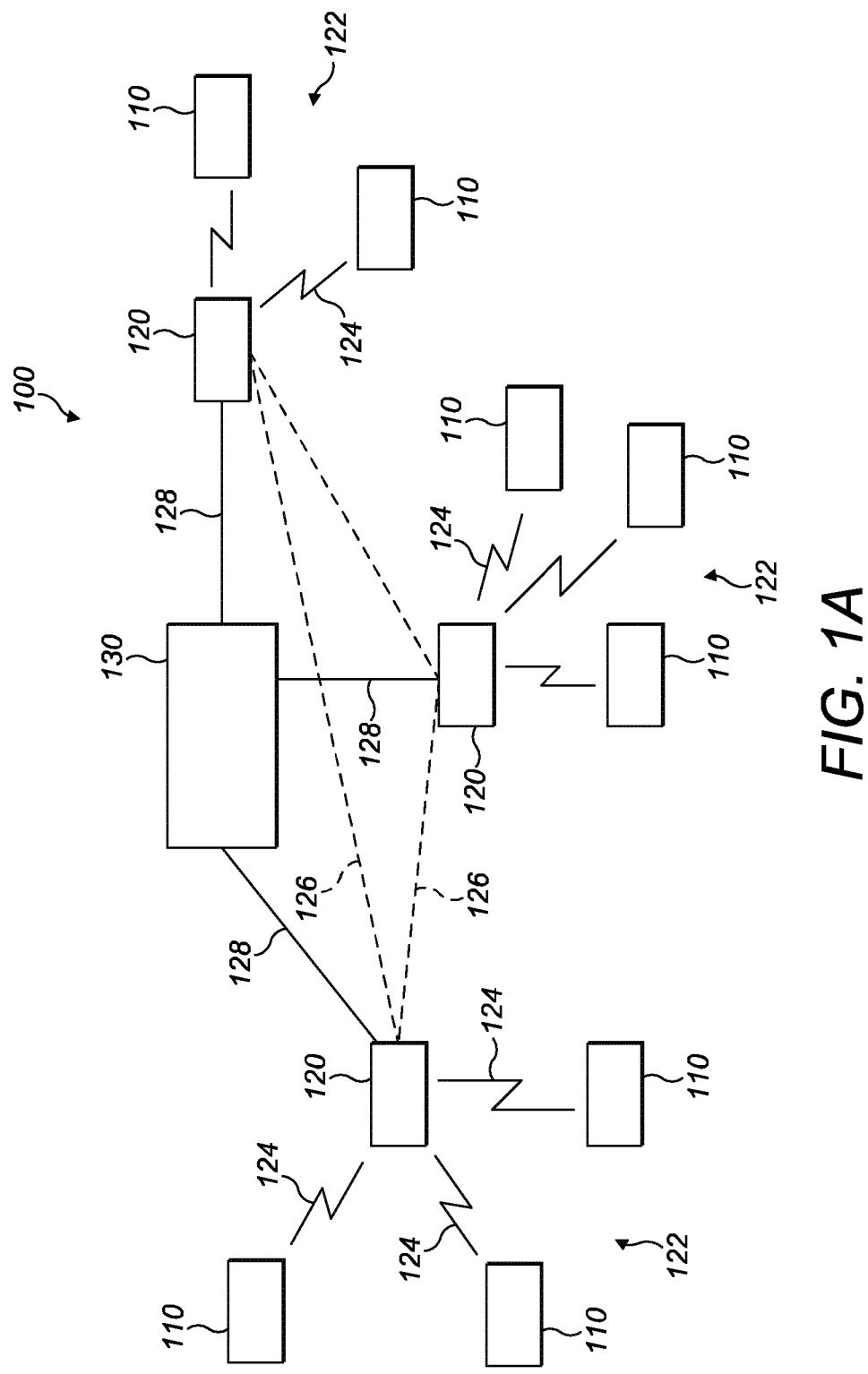
FIGS. 1A and 1B show an example of the subject matter described herein.

AMF Access and Mobility Management Function
DL Downlink
eMBB enhanced Mobile Broadband
MT Mobile Terminal
NG Next Generation
NGAP Next Generation Application Protocol
NG-RAN Next Generation RAN
NR New Radio
NSSAI Network Slice Selection Assistance Information
PCI Physical cell Layer Identity
PLMN Public Land Mobile Network
RA Registration area
RAN Radio Access Network
RAT Radio Access Technology
RNA RAN Based Notification Area
RNAU RAN Based Notification Area Update
RRC Radio Resource Control SD Slice Differentiator
SIBs System Information Blocks
SIM Subscriber Identity Module
S-NSSAI Single-Network Slice Selection Assistance Information
SST Slice Service Type
TA Tracking Area
TAC Tracking Area Code
TAI Tracking Area Identity
UE User Equipment
URLLC Ultra Reliable low Latency Communication
UPF User Plane Function
UTRAN Universal Terrestrial Radio Access Network
Xn-AP Xn Application Protocol

DETAILED DESCRIPTION

FIG. 1 illustrates an example of a network 100 comprising a plurality of network nodes including terminal nodes 110, access nodes 120 and one or more core nodes 130. The terminal nodes 110 and access nodes 120 communicate with each other. The one or more core nodes 130 communicate with the access nodes 120.

The one or more core nodes 130 can, in some examples, communicate with each other. The one or more access nodes 120 can, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 comprises a cellular radio transceiver. The terminal nodes 110 comprises a cellular radio transceiver.

In the example illustrated the cellular network 100 is a third generation Partnership Project (3GPP) network in which the terminal nodes 110 are user equipment (UE) and the access nodes 120 are base stations.

In the particular example illustrated the network 100 is a Universal Terrestrial Radio Access network (UTRAN). The UTRAN consists of UTRAN NodeBs 120, providing the UTRA user plane and control plane (RRC) protocol terminations towards the UE 110. The NodeBs 120 are interconnected with each other and are also connected by means of the interface 128 to the Mobility Management Entity (MME) 130.

The term 'user equipment' is used to designate mobile equipment comprising a smart card for authentication/encryption etc such as a subscriber identity module (SIM). In other examples the term 'user equipment' is used to designate mobile equipment comprising circuitry embedded as part of the user equipment for authentication/encryption such as software SIM.

The NodeB can be any suitable base station. A base station is an access node 120. It can be a network element in radio access network responsible for radio transmission and reception in one or more cells to or from the user equipment.

The UTRAN can be a 4G or 5G network, for example. It can for example be a New Radio (NR) network that uses gNB or eNB as access nodes 120. New radio is the 3GPP name for 5G technology.

Such networks 100 can also comprise next generation mobile and communication network, for example, a 6G network.

Such networks 100 can use network slicing to support different services using the same network infrastructure.

Network slicing enables the selection and allocation of network resources to suit the requirements of a specific service. For example, an enhanced Mobile Broadband (eMBB) UE 110 is likely to require high throughputs so that UE 110 can be allocated resources which support high throughputs. An Ultra Reliable Low Latency Communication (URLLC) UE 110 is likely to require low latency so that UE 110 can be allocated network resources that support low latency.

A network slice can be uniquely identified via the Single-Network Slice Selection Assistance Information (S-NSSAI). 3GPP specifications allow a UE 110 to be simultaneously connected and served by up to eight S-NSSAIs while each cell can support tens or even hundreds of S-NSSAIs.

Figure 1B:
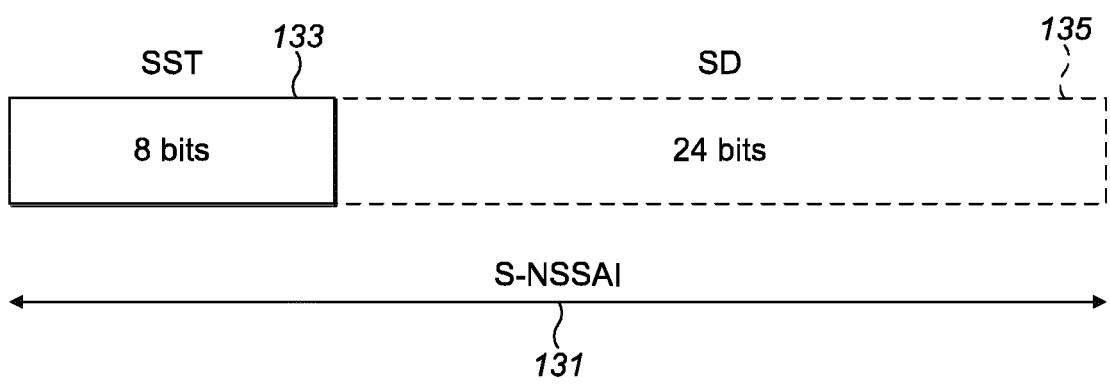

FIG. 1B shows an example S-NSSAI 131. In the example shown in FIG. 1B the S-NSSAI 131 comprises a Slice Service Type (SST) field 133 and a Slice Differentiator (SD) field 135. In the example shown in FIG. 1B the S-NSSAI 131 has a total length of 32 bits where the SST field 133 comprises 8 bits and the SD field 135 comprises 24 bits. In other examples the S-NSSAI 131 can comprise just the SST field 133. In such cases the S-NSSAI 131 would be only 8 bits long.

The SST field 133 can have standardized or non-standardized values. The standardized values can comprise 0 to 127. For instance, an SST field 133 value of 1 can indicate that a network slice is suitable for handling of 5G eMBB while an SST field 133 value of 2 can indicate that the network slice is suitable for handling of URLLC. The SD field 135 can be operator defined.

To enable mobility among neighbouring cells 122 UEs 110 not in the connected mode use a cell re-selection procedure. UEs 110 not in the connect mode can be in an idle mode or inactive mode. The purpose of cell re-selection procedure is to ensure that the idle mode UE 110 or the inactive mode UE 110 is always camped on the most suitable cell 122. The network can influence the cell re-selection procedure by adjusting the broadcast information of individual cells in different System Information Blocks (SIBs). These SIBs can comprise a plurality of configuration parameters that the UE 110 can use to evaluate the radio quality of the currently camped-on cell 122 and neighbouring cells 122. The UE 110 can use these evaluations to switch the camped-on cell 122, for example, as the UE moves between different cells 122. In some examples the UE 110 can use intra-frequency re-selection. Intra-frequency reselection is based on ranking of cells 122. In some examples the UE 110 can use inter-frequency reselection. Inter-frequency reselection is based on absolute priorities where the UE 110 tries to camp on the highest priority frequency available.

Priority configurations can indicate the priorities of different NR frequencies or inter-RAT frequencies. In some examples the priority configurations can be provided to the UEs 110 using the system information. In some examples the priority configurations can be provided to the UEs 110 in dedicated signalling for example in an RRCRelease message. In examples where the priority configurations are provided in the system information an NR frequency or inter-RAT frequency can be listed in the field cellReselectionPriority. In examples where the priority configurations are provided in dedicated signalling the UE 110 is configured to use the priority configurations given in the dedicated signalling instead of those given in the system information. The priority configurations given in the dedicated signalling can remain valid for a predetermined time period. The priority configurations can remain valid until the expiry of a time such as T320.

Examples of this disclosure enable priority configurations to be handled in a way that enables network slices to be taken into account. For example, it can enable different network slices in different cells 122 to be taken into account.

The network 100 can comprise one or more tracking areas (TAs). A TA can comprise one or more cells. Tracking Area identity (TAI) can be used to identify TAs. The TAI can be constructed from the PLMN identity the TA belongs to and the TAC (Tracking Area Code) of the TA. A registration area (RA) comprises TAs that support the same network slices from the perspective of a UE 110. When a UE 110 registers to the network 100 it can indicate the network slices to which it might need access. The network slices can be identified using S-NSSAIs 131.

When a UE 110 indicates network slices the core nodes 130 can be configured to analyse profiles of the UE 110 and subscription data to verify the list of network slices the UE 110 is able to access. A core node 130 can then send a list of allowed network slices to the UE 110, for example, an AMF in a 5G network. The list of allowed network slices can be sent to the UE 110 in allowed Network Slice Selection Assistance Information (NSSAI).

The allowed network slices can be different to the network slices that were requested by the UE 110. In some examples the allowed network slices can comprise a subset of the network slices that were requested by the UE 110. The difference between the allowed network slices and the requested network slices could be because the UE 110 might not have access one or more of the requested network slices, or because the network slice is not supported in the TA in which the UE 110 was located when the request was made.

If one or more network slices are allowed then the core nodes 130 configure a registration area (RA) for the UE 110. The RA comprises the TAs in which the network slices that have been allowed for the UE 110 are supported. The core nodes 130 know the current TA of the UE 110 from the registration request. The core node 130 can also know the network slices that are supported by neighbouring TAs. The core nodes 130 therefore can use this information to configure a list of TAs for the UE 110 which provide the same network slice support as the TA in which the UE 110 made the request.

When the idle UE 110 moves outside of the TAs comprised within the RA the UE 110 performs a Registration Area Update. When the UE 110 performs the Registration Area Update the core network can re-evaluate the network slices requested by the UE 110 to configure possibly a new registration area.

The core nodes 130 know the location of an idle UE 110 in terms of an RA. In cases where the service request is originated by the network 100 the Access and Mobility Management Function (AMF) pages the gNBs 120 belonging to the TAs of the RA. The AMF can be configured to apply different paging policies. For instance, in some cases the AMF can page only part of the RA. The part of the RA that is paged can be based on the last TA where the UE 110 made the RA update. A large RA therefore requires fewer RA updates but requires more paging signalling compared to a small RA which requires more RA updates but less paging signalling. A smaller RA might also enable a UE 110 to be reached more quickly and so could be preferred for certain services such as services with delay constraints. A UE that belongs to a network slice with a large coverage area could therefore be configured with an RA that does not include all of the TAs in which the slice is supported but only a subset of the TAs. The subset can be based on the current TA of the UE 110.

If a UE 110 is in RRC_INACTIVE state, the UE 110 remains in CM-CONNECTED and can move within an area configured by NG-RAN, such as RAN Based Notification Area, without notifying NG-RAN. When the UE 110 is in the RRC_INACTIVE state, the last serving gNB 120 keeps the UE 110 context and the UE-associated NG connection with the serving AMF and UPF. If the last serving gNB 120 receives DL data from the UPF or DL UE-associated signalling from the AMF (except the UE 110 Context Release Command message) while the UE 110 is in RRC_INAC-TIVE, the gNB 120 will page in the cells 122 corresponding to the RAN Based Notification Area and can send XnAP RAN Paging to neighbouring gNB(s) 120 if the RAN Based Notification Area includes cells of neighbouring gNB(s) 120. The NG-RAN therefore knows the location of the UE 110 in RRC_INACTIVE in terms of the configured RAN Based Notification Area (RNA). In addition, when the UE 110 transitions to RRC_INACTIVE, the NG-RAN node can configure the UE 110 with a periodic RAN Based Notification Area Update timer value. A UE 110 in the RRC_INAC-TIVE state can initiate an RAN Based Notification Area update (RNAU) procedure when it moves out of the configured RAN Based Notification Area. The RNA can cover one or more cells within the RA provided by a core node 130. The RNA can be configured in different ways, for example, a UE 110 can be provided an explicit list of one or more cells or a UE 110 can be provided a list of one or more RAN areas. A RAN area can be identified via a RAN area ID and can be a subset of a TA or equal to a TA. A cell can broadcast one or more RAN area IDs in the system information.

Neighbouring gNBs 120 can exchange slice support information for the respective TAs over the Xn interface during Xn Set-Up and NG-RAN Node Configuration Update procedures.

In networks 100 such as the network shown in FIG. 1A an operator can require different priority configurations for different network slices and/or in different areas. However, the dedicated priority configuration always overwrites the broadcast priorities if configured. The overwriting is valid for a certain time (T320), after which dedicated priority loses its validity.

Figure 2:
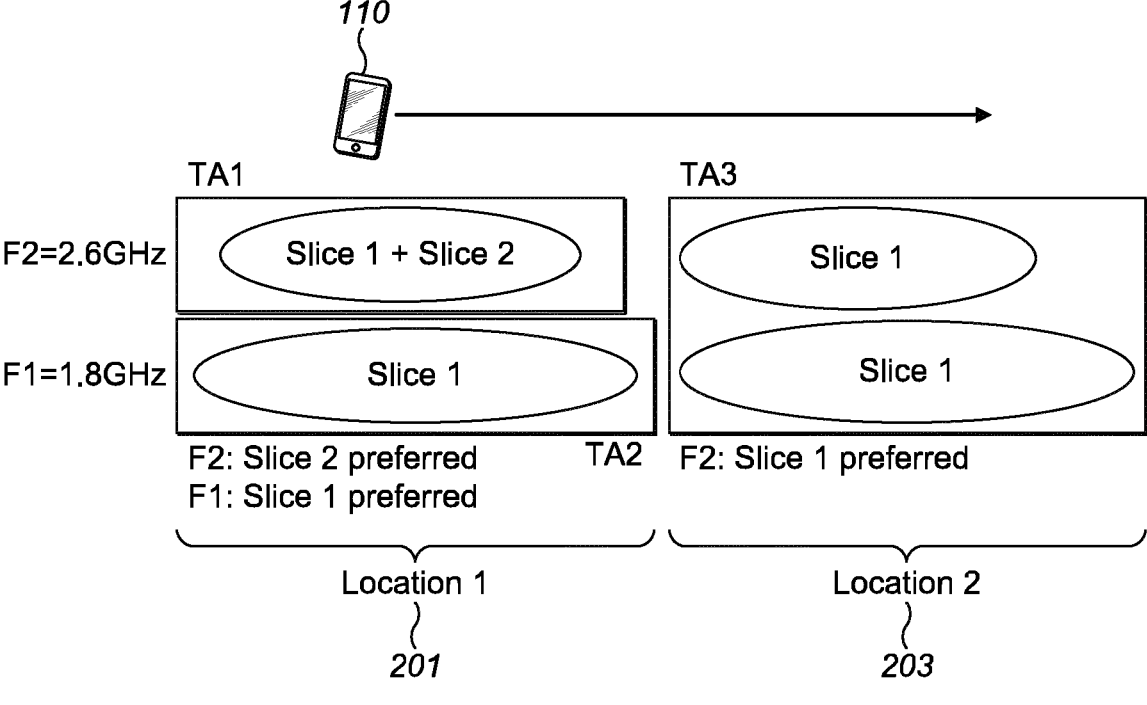
FIG. 2 shows another example of the subject matter described herein.

This issue is shown in FIG. 2 where different frequency priority configurations are required for different network slices in different locations. The example shown in FIG. 2 comprises a first location 201 and a second location 203. The first location 201 comprise two TAs TA1 and TA2. Network slice 1 and network slice 2 can be used in the first TA2 and network slice 1 can be used in the second TA2. The second location comprises a single TA3 in which network slice 1 is used. It is to be appreciated that this is shown as an example and that other arrangements of locations, TAs and network slices could be used in other examples of the disclosure.

At a first location 201 a first frequency F1 is preferred for network slice 1 and a second frequency F2 is preferred for network slice 2. At a second location 203 a second frequency F2 is preferred for network slice 1. In this example the first frequency F1 is 1.8 GHz and the second frequency F2 is 2.6 GHz. Other frequencies could be used in other examples of the disclosure.

When a UE 110 is at the first location 201 it can obtain information indicating the frequency preferences of the different network slices via dedicated signalling such as an RRCRelease message. This frequency preferences stay valid for the time T320 and overwrites any information broadcast for the second location 203. This results in the frequency preference information being incorrect for the second location 203. This can result in incorrect frequency priority configurations being enforced.

Examples of this disclosure provide for methods and systems for enabling the correct frequency priority configurations to be enforced at different locations. The priority configurations can be relative to different network slices or can be network slice agnostic.

Figure 3A:
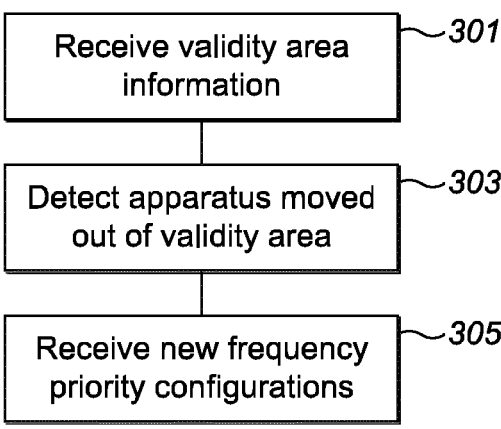
FIGS. 3A to 3C show another example of the subject matter described herein.

FIG. 3A shows an example method that can be implemented by an apparatus in examples of the disclosure. The apparatus could be comprised within a device such as a UE 110 with a Subscriber Identity Module (SIM) or a mobile terminal (MT) in examples of the disclosure.

At block 301 the method comprises receiving information indicative of a validity area for the apparatus. The validity area comprises an area in which priority configurations assigned to the apparatus are valid. The valid priority configurations can be any configurations that are enforced by the network and/or which are accepted by the network. The valid priority configurations can comprise one or more priority configurations. The priority configurations can be valid for a given area, a given time period, a given network slice or any combination of these. In some examples the apparatus can receive information indicative of a single validity area. In other examples the apparatus can receive information indicative of a plurality of different validity areas. In some examples the information indicative of the validity area can be associated with one or more network slices, which can be in the form of an association with one or more network slice IDs.

The priority configurations comprise information indicative of the preferred frequency for a given location within the network 100. In some examples the priority configurations comprise frequency priority configurations for one or more network slices.

The priority configurations can be provided to the apparatus as part of cell selection and/or cell reselection information/configuration.

The validity area can comprise any area in which the priority configurations assigned to the apparatus, or groups of apparatus, are valid. The validity area can comprise at least one of: one or more cells, one or more tracking areas, one or more Radio Access Network (RAN)—based Notification Areas, one or more RAN areas.

The information indicative of the validity area can be received in dedicated signalling. For example, the apparatus can receive an RRC message comprising one or more fields indicating the validity area. The validity area can be indicated using any suitable information. For example, the validity area can be indicated by indicating the cell IDs of the cells 122 that are comprised within the validity area. The cell IDs could comprise Physical cell Layer Identity (PCI) or any other suitable information. In some examples the validity area can be indicated by indicating TA IDs. The TA IDs could comprise Tracking Area Codes (TAC), Tracking Area Identities (TAI) or any other suitable information.

In some examples the validity area can be assigned to a single apparatus. In such examples the validity area is specific to the single apparatus. In other examples the validity area can be assigned to a plurality of apparatus.

The validity area can be based on network slice assistance information. Different network slices can be associated with different validity areas.

At block 303 the method comprises detecting that the apparatus has moved out of the validity area. The apparatus can detect that it has moved out of the validity area by detecting camping on a cell outside the provided validity area. For example, the apparatus can detect camping on a cell with cell ID outside the list of cell IDs provided in the validity area information. The apparatus can detect that it has moved out of the validity area by detecting camping on a cell that has priority configurations that are different to the priority configurations of the validity area. For example, the apparatus can detect that it is camping on cell that has different frequency preferences and/or network slice priorities.

There can be other means for detecting that the UE 110 has moved out of the validity area or the UE 110 would move out of the validity area. For instance, the UE 110 can detect that the measured signal power of a cell is increasing relative to the currently camped cell. In such a case, the UE 110 can use further available information such as trajectory and speed information of the UE 110. Furthermore, in such a case, the UE 110 can predict that it would move out of the validity area.

In response to detecting that the apparatus has moved out of the validity area, at block 305 the method comprises receiving new priority configurations and following the new priority configurations. The new priority configurations can be broadcast priority configurations. The broadcast priority configurations can be transmitted by the new cell 122. The new priority configurations can comprise any priority configurations that are different to the priority configurations with which the UE 110 was originally configured. In some examples the new priority configurations can comprise replacement priority configurations that replace the original priority configurations. In some examples the new priority configurations can comprise additional configurations that add to the original priority configurations. In some examples the new priority configurations could comprise a partial replacement of the original priority configurations. For example, some of the priority configurations could be updated while others remain unchanged. Once the new priority configurations are received by the apparatus, the apparatus shall apply the new priority configurations.

In some examples the apparatus can be configured to terminate the priority configurations assigned to the apparatus in response to detecting that the apparatus has moved out of the validity area.

In some examples the apparatus can be configured to trigger early expiration of timer T320 in response to detecting that the apparatus has moved out of the validity area so as to trigger termination of priority configurations assigned to the apparatus. In other examples the apparatus can be configured to prevent timer T320 being started when the apparatus is assigned the priority configurations. If the timer T320 is not started then the apparatus will apply the dedicated priority configurations in the indicated validity area until the apparatus is reconfigured by the network 100 and so will avoid the apparatus reselecting the broadcast priority configurations.

Figure 3B:
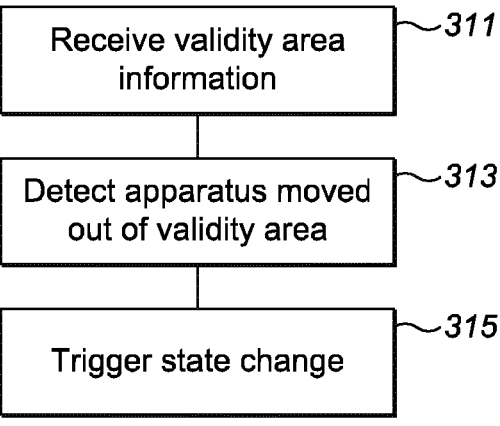

FIG. 3B shows another example method that can be implemented by an apparatus in examples of the disclosure. The apparatus could be provided within a device such as a UE 110 comprising a SIM or an MT or any other suitable device.

At block 311 the method comprises receiving information indicative of a validity area for the apparatus and at block 313 the method comprises detecting that the apparatus has moved out of the validity area. Blocks 311 and 313 can be performed as described in relation to FIG. 3A.

In response to detecting that the apparatus has moved out of the validity area, at block 315 the method comprises triggering a state change to a connected mode to obtain new priority configurations from an access node. In some examples the state change can change the UE 110 from RRC_IDLE or RRC_INACTIVE to RRC_CONNECTED. The state change causes the apparatus to receive new priority configuration from the new cell or other parts of the network 100.

The UE 110 can have different means for detecting that the UE would move out of the validity area. This can enable the UE 110 to proactively trigger a state change at block 315.

Figure 3C:
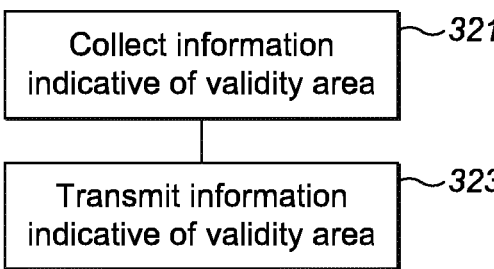

FIG. 3C shows an example method that can be implemented by a network apparatus. The network apparatus could be provided within a gNB, an AMF or any other suitable part of the network 100.

At block 321 the method comprises collecting information indicative of a validity area for an apparatus wherein the validity area comprises an area in which priority configurations assigned to the apparatus are valid. The apparatus could be comprised within a UE 110 or an MT or any other suitable device. The method could comprise collecting information indicative of frequency preferences and network slice priorities at different access nodes in the network and using the collected information to determine the validity area. The collected information can be indicative of one or more frequency preferences and/or one or more network slice priorities.

The collecting of the information provides the network apparatus with up to date information about the current priority configurations of different neighboring RAN nodes. The network apparatus can then use this up to date information to configure the UE's registration area (RA), RAN notification area (RNA) or the network slice preferences accordingly.

Different methods can be used by the network 100 to collect the information. In some examples access nodes 120 such as gNBs can directly exchange information such as frequency priorities and network slice preference information for their cells 122 and/or TAs. The direct exchange of information can be performed over the interface between the gNBs. The interface could be the Xn interface in 5GS, or any other suitable interface.

In other examples, access nodes 120 such as gNBs exchange frequency priorities and slice preferences information of their cells and/or TAs with the core network. The direct exchange of information can be performed over the NG interface in 5GS with the AMF. Subsequently, the AMF can provide this information to other relevant gNBs. The relevant gNBs could be neighboring gNBs.

In other examples the frequency/slice preference can be a gNB/cell configuration parameter that can be read by or reported to a management plane entity, such as, Operational Administration Maintenance (OAM) or configured by OAM. The OAM can forward this information to other related elements in both RAN (such as, gNBs) and core network (such as, AMF).

This information can be collected and reported at different granularities. For example, the information can be collected at cell, gNB and/or TA level, or any other suitable level.

At block 323 the method comprises transmitting the information indicative of the validity area to the apparatus. The information indicative of the validity area is transmitted to the apparatus via dedicated signalling. The dedicated signalling can comprise a message that is only sent to one UE 110 or other apparatus. The dedicated signalling can comprise an RRC message or any other suitable type of message.

In some examples, if it is determined that the apparatus has moved out of the validity area, then the method can comprise causing transmission of new priority configurations to the apparatus.

It is to be appreciated that variations could be made to the methods shown in FIGS. 3A to 3C. For instance, in some examples the validity area and priority configurations such as dedicated cell reselection priorities could be associated with one or more network slice IDs. The Network Slice ID can comprise SSD and SST identifiers. In such examples network slice priorities can determine which frequencies are used to camp on. That is, the UE 110 could camp on the preferred frequency where the prioritized network slice or slices have preference. Such network slice priority can be pre-configured at the UE 110 or can be provided by network 100 via registration and/or registration area update procedures or any other suitable signaling.

Adding slice related information of serving cell and neighboring cells for cell selection is an enhancement of the legacy mechanisms. New enhancements (such as priority configurations) can help to overcome the limitations of legacy mechanism.

Providing slice related cell reselection information in RRCRelease is an efficient way to help UEs 110 to reselect cells that supports the allowed S-NSSAIs. New validity options can be specified to overcome limitations of the legacy mechanism.

Figure 4:
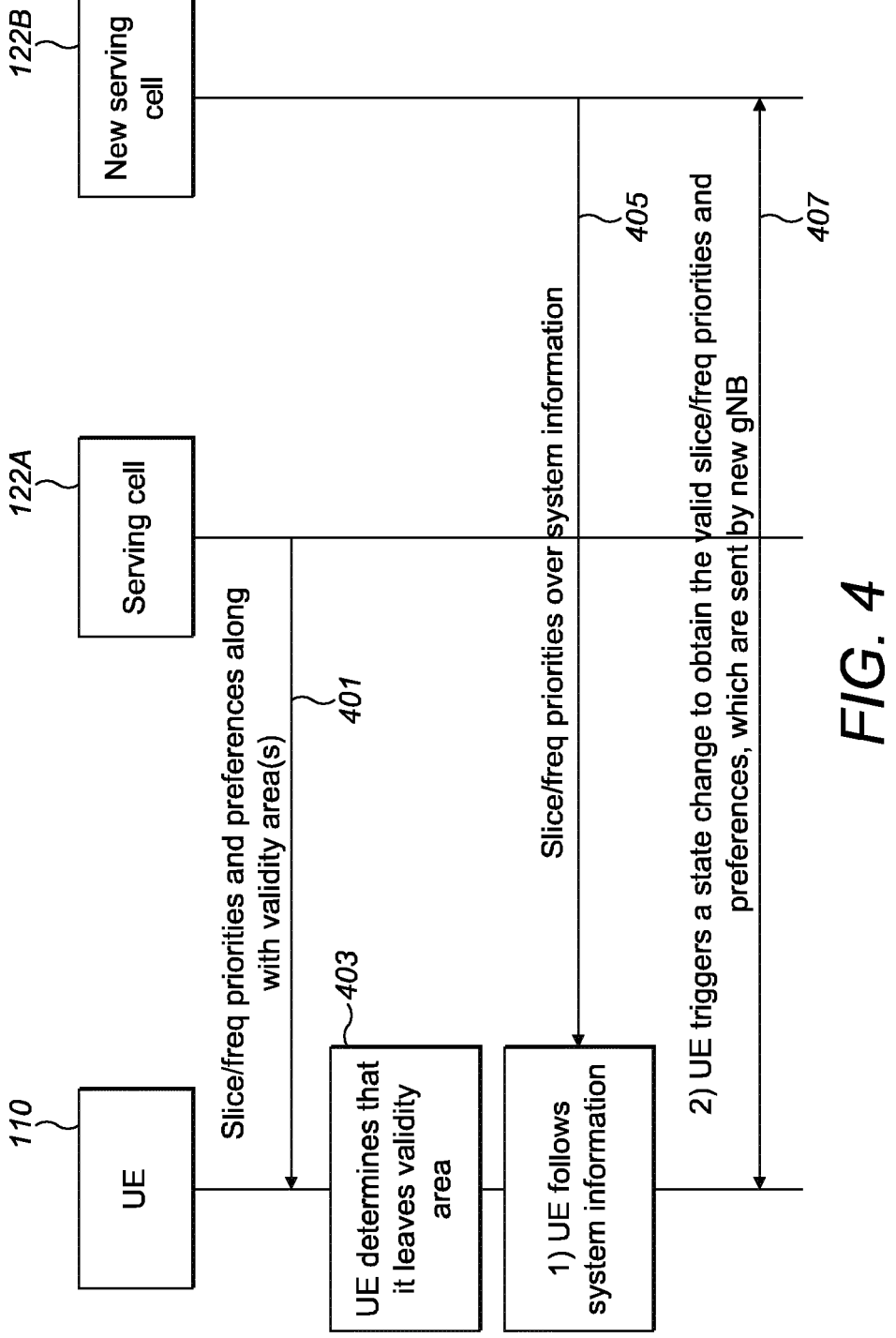
FIG. 4 shows another example of the subject matter described herein.

FIG. 4. shows an example signal flow for the methods shown in FIGS. 3A to 3C and described above.

At block 401 the UE 110 obtains the frequency (freq) priority configuration information from the serving cell 122A. The priority configuration can comprise frequency priorities and/or network slice priorities and/or any other suitable information.

At block 401 the UE 110 also obtains the information indicative of the validity area. The information indicative of the validity area can also be obtained from the serving cell 122A. In some examples the information indicative of the validity area can be obtained with the priority configuration information.

At block 403 the UE 110 determines that it has left the validity area. In some examples, when the UE 110 has left the validity area, the UE 110 and the network 100 can follow block 405. In block 405 the new serving cell 122B transmits new priority configuration information to the UE 110. The new priority configuration information comprises the frequency priorities and/or network slice priorities and/or any other suitable information that applies for the new area of the UE 110. The priority configuration for the new cell can be transmitted by the new serving cell 122B or any other suitable part of the network 100. The priority configuration can be broadcast by the new serving cell 122B. The priority configuration can be sent to a plurality of UE 110. The priority configuration can be multicast to a plurality of UE 110.

In other examples, when the UE 110 has left the validity area the UE 110 and the network can follow block 407. At block 407 the UE 110 triggers a state change. The state change can be from RRC_IDLE or RRC_INACTIVE to RRC_CONNECTED or any other suitable state change. When the state the change is triggered, the gNB of the new serving cell 122B sends the new priority configuration to the UE 110. In some examples, the gNB of the new serving cell 122B can send an updated priority configuration to the UE 110. The updated priority configuration can add new cells to the validity area.

In some examples the state change can be triggered by the UE 110. In other examples the state change can be triggered by the network 100. For instance, if it is determined that the UE 110 has moved out of a validity area then the network 100 can send a message to the UE 110 to trigger the state change.

Figure 5A:
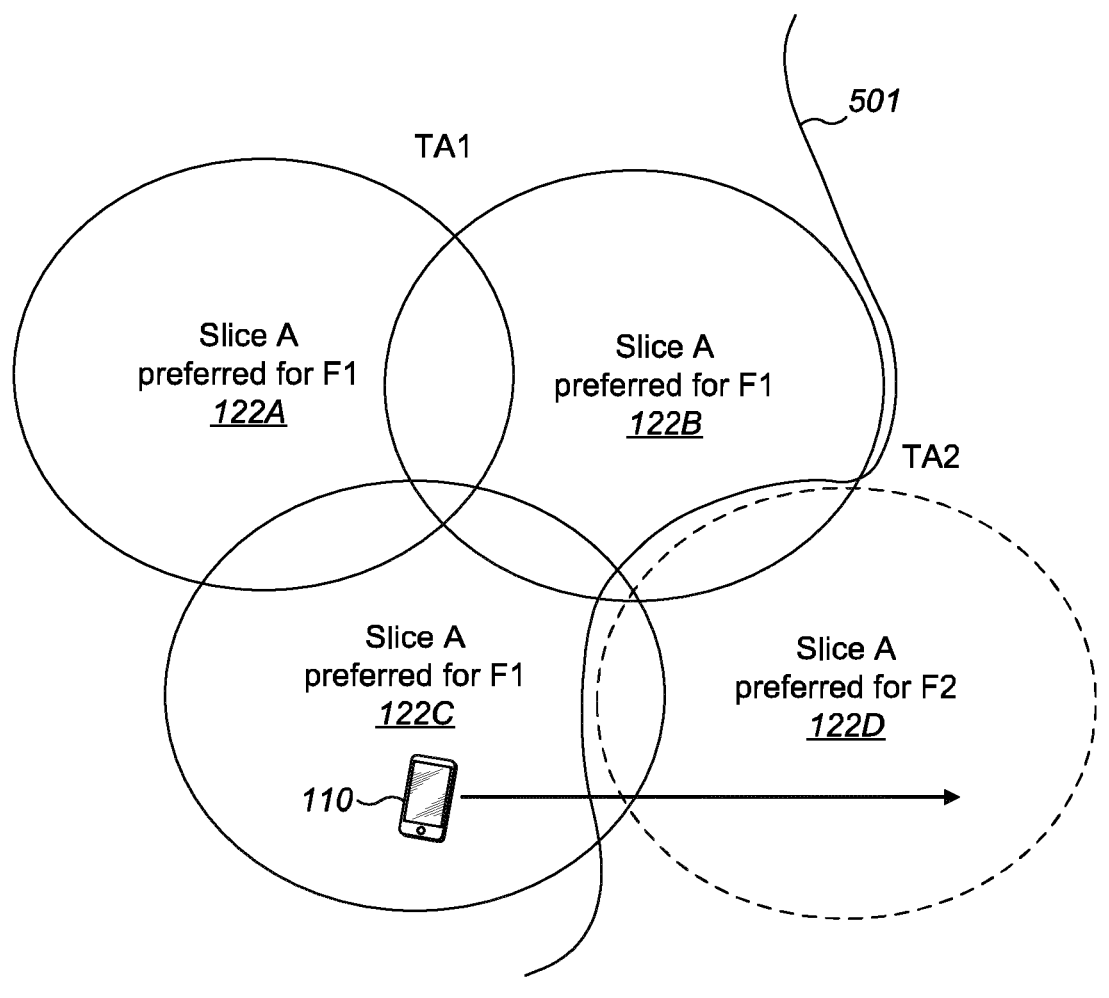
FIGS. 5A to 5C show another example of the subject matter described herein.
Figure 5B:
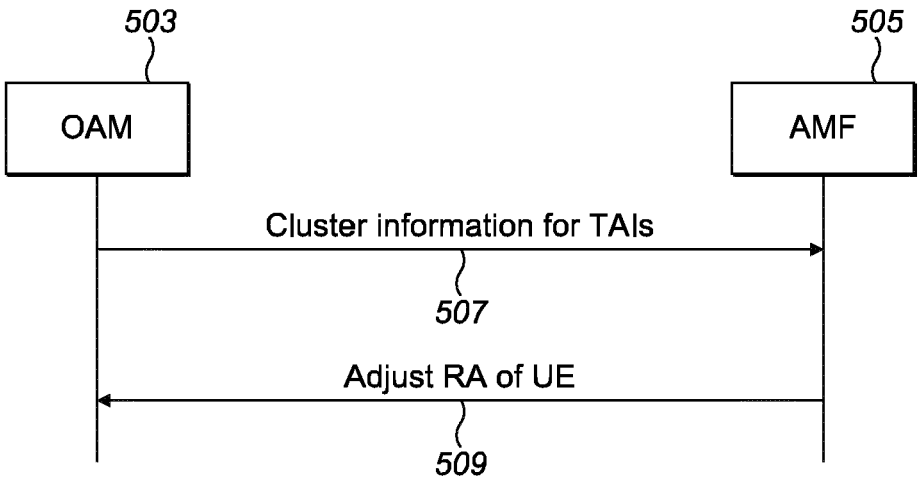
Figure 5C:
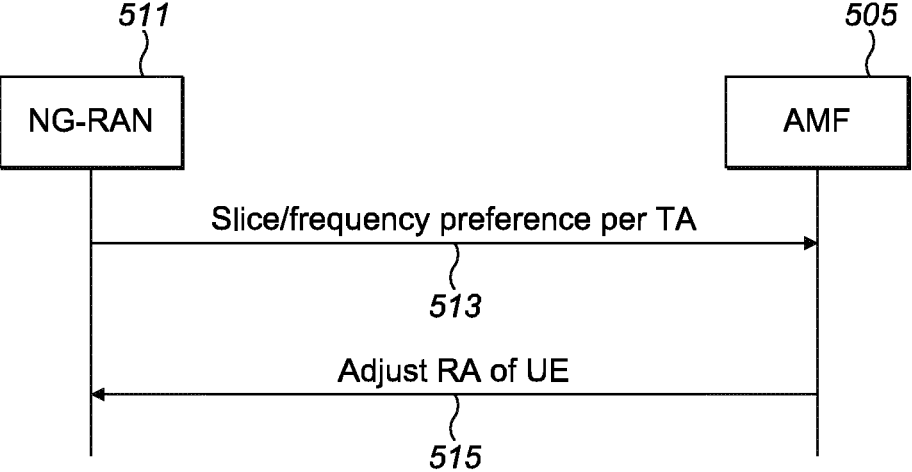

FIGS. 5A to 5C show another example embodiment of the disclosure. FIG. 5A shows a UE 110 moving between different areas. In FIG. 5A two Tracking Areas TAs are shown. In some examples the Tracking Areas comprise areas in which the same priority configuration information applies. In the example of FIG. 5A, in the first Tracking Area TA1 network slice A is preferred for a first frequency F1 and in the second Tracking Area TA2 network slice A is preferred for a second frequency F2. In the example shown in FIG. 5A the first Tracking Area TA1 comprises three cells 122A, 122B, 122C while the second Tracking Area TA2 comprises one cell 122D. It is to be appreciated that Tracking Areas comprising different numbers of cells 122 could be used in other examples of the disclosure.

A border 501 is provided between the respective Tracking Areas TA1, TA2. The border 501 indicates the threshold between the different areas where the priority configurations change.

FIGS. 5B and 5C show example signal flows for a method of managing priority configurations when the UE 110 crosses the border 501. The methods shown in FIGS. 5B and 5C can be used in examples where the UE 110 is in the RRC_IDLE state. The Core Network is not aware of the priority configurations in RAN. This means that the AMF cannot modify the RA of the UE 110, for example, considering the border 501. In the example shown in FIG. 5B the signals are exchanged between the OAM 503 and the AMF 505. At block 507 the OAM 503 provides information indicating the tracking areas that have uniform priority configurations. In the example of 5B this information comprises cluster information for TAIs where the slice preference is uniform. The cluster information could comprise an indication of all of the cells that are comprised within the TA. In other examples the information could comprise border information. The border information can comprise information related to a border 501. In such examples the information could indicate the places where the priority configurations change.

At block 509 the AMF signals to the UE to adjust the RA of the UE 110 or the AMF signals to the UE the RA of the UE 110. Adjusting the RA or providing such RA implies that the UE 110 performs a mobility registration area update once it crosses a border 501 across which the priority configurations change. That is, the provided RA excludes the tracking area that the UE 110 has just entered. For the UE 110 moving as shown in FIG. 5A the second Tracking Area TA2 would be excluded from the RA of the UE 110.

In the example shown in FIG. 5C the signals are provided to the AMF 505 from the NG-RAN 511, for example, gNBs. At block 511 the NG RAN provides information indicating the priority configurations of the different tracking areas and/or cells. The priority configurations can comprise network slice preference and/or frequency preference for each gNB and/or each cell served by each gNB. In some examples the gNBs can signal this information to the AMF 505 using Next Generation Application Protocol (NGAP) during Next Generation (NG) Set Up or Update Procedures or using any other suitable signals.

The AMF 505 can then use the information received from the NG-RAN to identify the different Tracking Areas, and/or to identify the border 501 at which the Tracking Area changes. The AMF can use this information to configure the RA for the UE 110.

At block 513 the AMF signals to the UE 110 to adjust the RA of the UE 110. Adjusting the RA or providing such RA implies that the UE performs a mobility registration area update once it crosses a border across which the priority configurations change. That is, the provided RA excludes the tracking area that the UE 110 has just entered. For the UE 110 moving as shown in FIG. 5A the second Tracking Area TA2 would be excluded from the RA of the UE 110. This signaling could be performed in the registration procedures such as initial registration or registration area update or any other suitable procedure.

FIGS. 6A and 6B show more example signal flows for a method of managing priority configurations when the UE 110 crosses the border 501 as shown in FIG. 5A. The methods shown in FIGS. 6A and 6B can be used in examples where the UE 110 is in the RRC_INACTIVE state. When the UE 110 is in the RRC_INACTIVE state the NG_RAN has the information indicating the priority configurations of the neighbouring gNBs and/or Tracking Areas.

In the example signal flow shown in FIG. 6A the information indicating the priority configurations of the neighbouring gNBs and/or Tracking Areas and/or cells is received by the OAM 503 or configured by the OAM 503. At block 603 the OAM signals the information indicating the priority configurations to the serving gNB 601. The information indicating the priority configurations can comprise frequency priorities and/or network slice preferences for different areas. In some examples this information could comprise a list of cells and/or Tracking Areas and/or RAN areas.

At block 605 the serving gNB 601 adjusts the RAN Notification Areas based on the received information indicating the priority configurations. The RAN Notification Areas are adjusted so that the UE 110 performs a RAN Notification Area Update when it enters the second Tracking Area TA2. The priority configuration information for the second Tracking Area TA2 can then be provided to the UE 110 when it performs the RAN Notification Area Update.

In the example signal flow shown in FIG. 6B the information indicating the priority configurations of the neighbouring gNBs and/or Tracking Areas and/or cells is received by the neighbouring gNBs 607. At block 609 the neighbouring gNBs signal the information indicating the priority configurations to the serving gNB 601. The information indicating the priority configurations can comprise frequency priorities and/or network slice preferences for different areas. In some examples this information could comprise a list of cells and/or Tracking Areas and/or RAN areas.

At block 611 the serving gNB 601 adjusts the RAN Notification Areas based on the received information indicating the priority configurations. The RAN Notification Areas are adjusted so that the UE 110 performs a RAN Notification Area Update when it enters the second Tracking Area TA2. The priority configuration information for the second Tracking Area TA2 can then be provided to the UE 110 when it performs the RAN Notification Area Update.

The examples shown in FIGS. 5A to 6B therefore provide a network-based solution for managing different frequency preferences. These examples provide:

A network apparatus comprising means for:

obtaining priority configuration information for a plurality of different areas;

identifying a plurality of areas having the same priority configuration;

determining that an apparatus has moved from a first area having a first priority configuration to a second area having a second, different priority configuration;

enabling updating of the priority configuration for the apparatus.

The priority configuration information for a plurality of different areas can obtained from at least one of, one or more gNBs, one or more Management Entities.

The network apparatus can determine that the apparatus has moved from a first area to a second area in response to a notification from the apparatus.

The network apparatus can be an Access and Mobility Management Function (AMF). In such cases the apparatus that has moved from a first area to a second area is provided within an idle UE A network apparatus can be a serving gNB. In such cases the apparatus that has moved from a first area to a second area is provided within an inactive UE.

In other example for managing the priority configurations the UE 110 can trigger the updates that are required. In such examples the UE 110 detects a change in priority configuration when it enters a new area such as a new Tracking Area. The detection of the new priority configurations triggers the UE 110 to re-asses the priority configurations.

The UE 110 can detect a change in the priority configurations when the UE 110 observes a mismatch between priority configurations provided to the UE 110 in dedicated signalling and the priority configurations provided in broadcast signalling. In some examples the UE 110 can detect a change in the priority configurations if it is determined that the UE 110 has moved out of a validity area. In some examples the UE 110 can detect a change in the priority configurations if the UE 110 determines that it got new priority configurations for network slices from the AMF.

When the UE 110 detects a change in the priority configurations the UE 110 triggers a state change from the RRC_INACTIVE state to the RRC_CONNECTED state. This state change causes the UE 110 to be provided with the new priority configurations.

Figure 7:
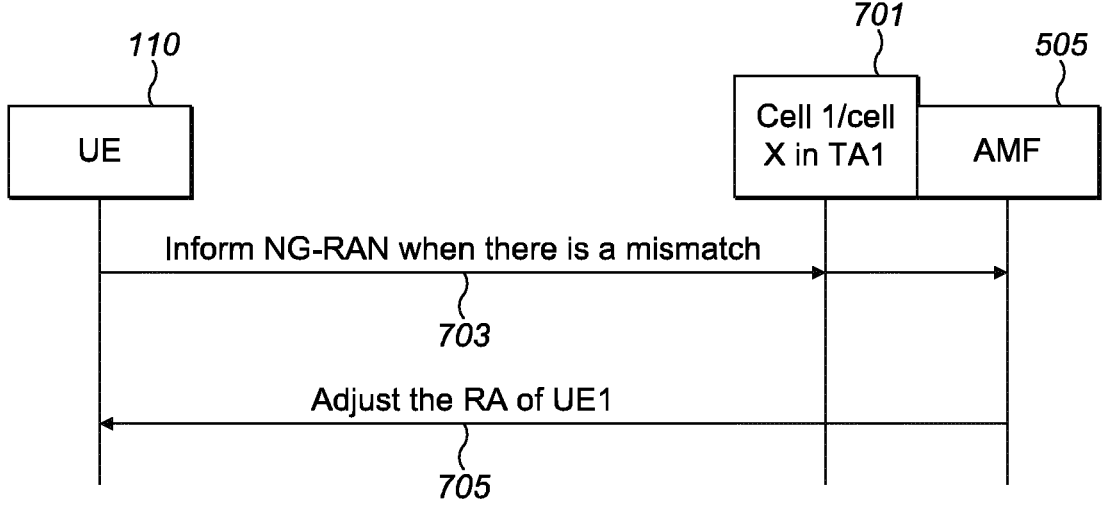
FIG. 7 shows another example of the subject matter described herein.

FIG. 7 shows another example signal flow that can be used for managing frequency preferences when the UE 110 crosses the border 501 as shown in FIG. 5A when the UE 110 is in an Idle state. In the example shown in FIG. 7 the UE 110 uses the System Information, for example, System Information Block 4 (SIB4) to compare the priority configurations for neighboring cells. The UE can identify if there is a mismatch in the priority configurations before camping on the neighbor cell. When the UE 110 detects that there is a mismatch in the priority configurations, the UE 110 can trigger a state change to obtain the valid priority configurations.

As shown in FIG. 7 when the UE 110 detects a mismatch in the priority configurations the UE 110 informs the NG-RAN. In the example shown in FIG. 7 the UE 110 informs the cells 701 of the first Tracking Area TA1. In this case the UE 110 context is not yet available in NG-RAN for the UE 110 in the idle mode and so the AMF 505 is also informed of for example, the mismatch in the priority configurations or any other relevant information, such as information that can be used for adjusting the RA of the UE 110.

At block 705 the AMF may signal to the UE 110 to adjust the RA of the UE 110. Adjusting the RA enables the UE to perform a mobility registration area update. The new RA excludes the tracking area that the UE 110 has just entered. For the UE 110 moving as shown in FIG. 5A, the second Tracking Area TA2 would be excluded from the RA of the UE 110. This signaling could be performed in the registration procedures such as initial registration or registration area update or any other suitable procedure.

Figure 8:
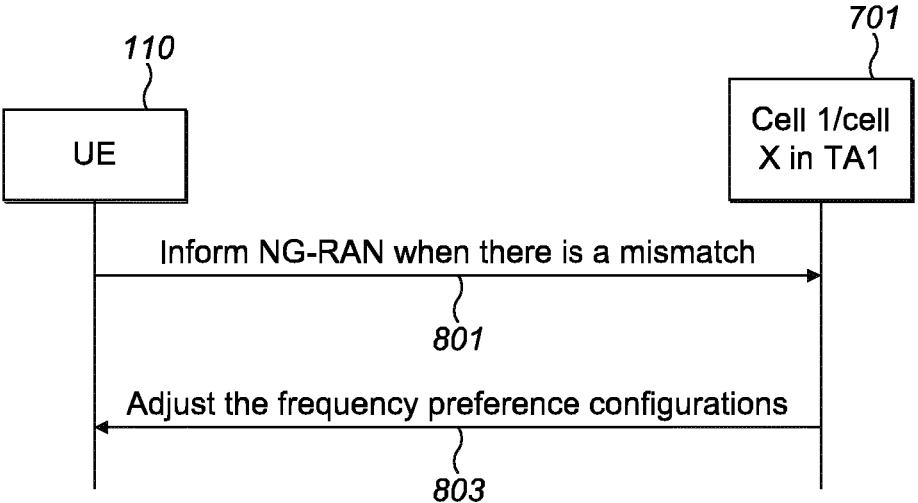
FIG. 8 shows another example of the subject matter described herein.

FIG. 8 shows another example signal flow that can be used for managing frequency preferences when the UE 110 that crosses the border 501 as shown in FIG. 5A is in an RRC_INACTIVE state.

In the example of FIG. 8 when the UE 110 detects a mismatch in the priority configurations the UE 110 informs the cells of the first Tracking Area TA1 701 at block 801. In this case the NG-RAN has the context for the UE 110 and so the AMF 505 might not need to be informed of the mismatch in the priority configurations.

At block 801 the cells of the first Tracking Area TA1 701 signal to the UE 110 to adjust the priority configurations for cell reselection.

In the examples shown in FIGS. 7 and 8 the state change of the UE 110 is triggered if a mismatch in the priority configurations is detected. In other examples the state change of the UE 110 can be triggered if no priority configurations are provided.

The examples shown in FIGS. 7 to 8 therefor provide a UE 110 based solution for managing different frequency preferences. These examples provide:

An apparatus comprising means for:

receiving priority configurations assigned to the apparatus;

detecting a difference between the priority configurations assigned to the apparatus and the network priority configurations for an area in which the apparatus is located;

in response to detecting the differences, causing the apparatus to change to a connected mode to enable new priority configurations to be assigned to the apparatus.

The apparatus can detect the difference between the priority configurations assigned to the apparatus and the network priority configurations for an area in which the apparatus is located when the apparatus moves outside of the area where the apparatus received the priority configurations.

The apparatus can detect the difference between the priority configurations assigned to the apparatus and the network priority configurations for an area in which the apparatus is located when the apparatus moves outside of the tracking area where the apparatus received the priority configurations.

The apparatus can detect the difference between the priority configurations assigned to the apparatus and the network priority configurations for an area in which the apparatus is located when the apparatus moves outside of the cell where the apparatus received the priority configurations.

Figure 9A:
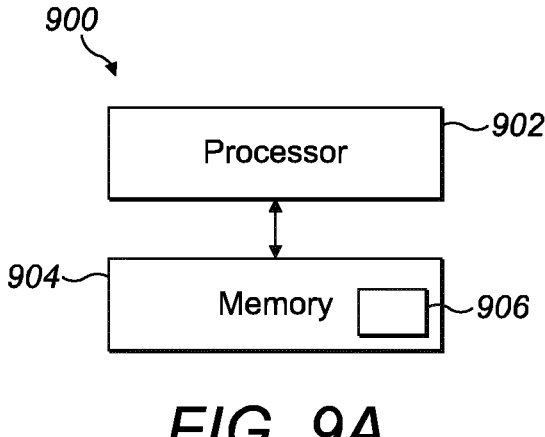
FIGS. 9A and 9B show another example of the subject matter described herein.

FIG. 9A illustrates an example of a controller 900. The controller 900 could be provided within an apparatus such as a UE 110 or a network apparatus. Implementation of a controller 900 may be as controller circuitry. The controller 900 may be implemented in hardware alone, have certain aspects in software including firmware alone or can be a combination of hardware and software (including firmware).

As illustrated in FIG. 9A the controller 900 may be implemented using instructions that enable hardware functionality, for example, by using executable instructions of a computer program 906 in a general-purpose or special-purpose processor 902 that may be stored on a computer readable storage medium (disk, memory etc) to be executed by such a processor 902.

The processor 902 is configured to read from and write to the memory 904. The processor 902 may also comprise an output interface via which data and/or commands are output by the processor 902 and an input interface via which data and/or commands are input to the processor 902.

The memory 904 stores a computer program 906 comprising computer program instructions (computer program code) that controls the operation of the apparatus when loaded into the processor 902. The computer program instructions, of the computer program 906, provide the logic and routines that enables the apparatus to perform the methods illustrated in FIGS. 3A to 8 The processor 902 by reading the memory 904 is able to load and execute the computer program 906.

In examples where the apparatus is provided within a UE 110 the apparatus therefore comprises: at least one processor; and at least one memory including computer program code; the at least one memory and the computer program code configured to, with the at least one processor, cause the apparatus at least to perform;

receiving information indicative of at least one validity area for the apparatus wherein the at least one validity area comprises an area in which at least one priority configuration assigned to the apparatus is valid;

detecting that the apparatus has moved out of the at least one validity area;

in response to detecting that the apparatus has moved out of the at least one validity area performing at least one of:

receiving at least one new priority configuration and following the at least one new priority configuration, or triggering a state change to a connected mode to obtain at least one new priority configuration from an access node.

Figure 9B:
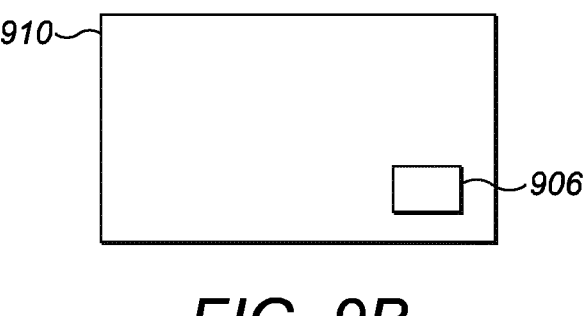

In examples where the apparatus is provided within a network device the apparatus therefore comprises: at least one processor; and at least one memory including computer program code; the at least one memory and the computer program code configured to, with the at least one processor, cause the apparatus at least to perform;

collecting information indicative of a validity area for an apparatus wherein the validity area comprises an area in which at least one priority configuration assigned to the apparatus is valid; and transmitting the information indicative of the validity area to the apparatus As illustrated in FIG. 9B, the computer program 906 may arrive at the apparatus or network apparatus via any suitable delivery mechanism 910. The delivery mechanism 910 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 906. The delivery mechanism may be a signal configured to reliably transfer the computer program 906. The apparatus may propagate or transmit the computer program 906 as a computer data signal.

Computer program instructions for causing a UE 110 to perform at least the following or for performing at least the following:

receiving information indicative of at least one validity area for the apparatus wherein the at least one validity area comprises an area in which at least one priority configuration assigned to the apparatus are valid;

detecting that the apparatus has moved out of the at least one validity area;

in response to detecting that the apparatus has moved out of the at least one validity area performing at least one of:

receiving at least one new priority configuration and following the at least one new priority configuration, or triggering a state change to a connected mode to obtain at least one new priority configuration from an access node.

Computer program instructions for causing a network device to perform at least the following or for performing at least the following:

collecting information indicative of a validity area for an apparatus wherein the validity area comprises an area in which at least one priority configuration assigned to the apparatus is valid; and transmitting the information indicative of the validity area to the apparatus The computer program instructions may be comprised in a computer program, a non-transitory computer readable medium, a computer program product, a machine readable medium. In some but not necessarily all examples, the computer program instructions may be distributed over more than one computer program.

Although the memory 904 is illustrated as a single component/circuitry it may be implemented as one or more separate components/circuitry some or all of which may be integrated/removable and/or may provide permanent/semi-permanent/dynamic/cached storage.

Although the processor 902 is illustrated as a single component/circuitry it may be implemented as one or more separate components/circuitry some or all of which may be integrated/removable. The processor 902 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in the FIGS. can represent steps in a method and/or sections of code in the computer program 906. The illustration of a particular order to the blocks does not necessarily imply that there is a required or preferred order for the blocks and the order and arrangement of the block may be varied. Furthermore, it can be possible for some blocks to be omitted.

Where a structural feature has been described, it may be replaced by means for performing one or more of the functions of the structural feature whether that function or those functions are explicitly or implicitly described.

In some but not necessarily all examples, the UE 110, and the network 100 are configured to communicate data with or without local storage of the data in a memory 904 at the UE 110, or the access nodes 120 and with or without local processing of the data by circuitry or processors at the UE 110, or the access nodes 120.

The data may be stored in processed or unprocessed format remotely at one or more devices. The data may be stored in the Cloud.

The data may be processed remotely at one or more devices. The data may be partially processed locally and partially processed remotely at one or more devices.

The data may be communicated to the remote devices wirelessly via short range radio communications such as Wi-Fi or Bluetooth, for example, or over long range cellular radio links. The apparatus may comprise a communications interface such as, for example, a radio transceiver for communication of data.

The UE 110, the network 100 can be part of the Internet of Things forming part of a larger, distributed network.

The processing of the data, whether local or remote, can be for the purpose of health monitoring, data aggregation, patient monitoring, vital signs monitoring or other purposes.

The processing of the data, whether local or remote, may involve artificial intelligence or machine learning algorithms. The data may, for example, be used as learning input to train a machine learning network or may be used as a query input to a machine learning network, which provides a response. The machine learning network may for example use linear regression, logistic regression, vector support machines or an acyclic machine learning network such as a single or multi hidden layer neural network.

The processing of the data, whether local or remote, may produce an output. The output may be communicated to the UE 110, and the access nodes 120 where it may produce an output sensible to the subject such as an audio output, visual output or haptic output.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

The invention claimed is:

1. An apparatus, comprising:
at least one processor; and
at least one memory storing instructions that, when executed with the at least one processor, cause the apparatus to perform:
receiving information indicative of at least one validity area for the apparatus wherein the at least one validity area comprises an area in which at least one priority configuration assigned to the apparatus is valid;
detecting that the apparatus has moved out of the at least one validity area;
in response to detecting that the apparatus has moved out of the at least one validity area performing at least one of:
receiving at least one new priority configuration and following the at least one new priority configuration, or
triggering a state change to a connected mode to obtain at least one new priority configuration from an access node, and
triggering early expiration of timer T320 to trigger termination of the at least one priority configuration assigned to the apparatus in response to detecting that the apparatus has moved out of the validity area.

2. The apparatus as claimed in claim 1, wherein the at least one priority configuration and the at least one new priority configuration comprise at least one frequency priority configuration.

3. The apparatus as claimed in claim 1, wherein the at least one priority configuration and the at least one new priority configuration comprises at least one frequency priority configuration for at least one network slice.

4. The apparatus as claimed in claim 3, wherein the at least one frequency priority configuration comprises information indicative of any one or more of:
at least one network slice preference; or
at least one network slice identifier.

5. The apparatus as claimed in claim 1, wherein the validity area is assigned to one or more apparatus.

6. The apparatus as claimed in claim 1, wherein the information indicative of the validity area is received in dedicated signalling.

7. The apparatus as claimed in claim 1, wherein the validity area comprises at least one of: one or more cells, one or more tracking areas, one or more radio access network-based notification areas, or one or more radio access network areas.

8. The apparatus as claimed in claim 1, wherein the instructions, when executed with the at least one processor, cause the apparatus to terminate the at least one priority configuration assigned to the apparatus in response to detecting that the apparatus has moved out of the validity area.

9. The apparatus as claimed in claim 1, wherein the instructions, when executed with the at least one processor, cause the apparatus to prevent timer T320 being started when the apparatus is assigned the at least one priority configuration.

10. The apparatus as claimed in claim 1, wherein the information indicative of the validity area is associated with at least one network slice identifier.

11. A user equipment comprising the apparatus as claimed in claim 1 and at least one subscriber identity module.

12. A mobile terminal comprising the apparatus as claimed in claim 1.

13. A method comprising:

receiving information indicative of at least one validity area for the apparatus wherein the at least one validity area comprises an area in which at least one priority configuration assigned to the apparatus is valid;

24 detecting that the apparatus has moved out of the at least one validity area;

in response to detecting that the apparatus has moved out of the at least one validity area performing at least one of:

receiving at least one new priority configuration and following the at least one new priority configuration, or triggering a state change to a connected mode to obtain at least one new priority configuration from an access node; and triggering early expiration of timer T320 to trigger termination of the at least one priority configuration assigned to the apparatus in response to detecting that the apparatus has moved out of the validity area.

14. A non-transitory program storage device readable with an apparatus, tangibly embodying a program of instructions executable with the apparatus for performing the method of claim 13.

* * * * *